Figure 1:
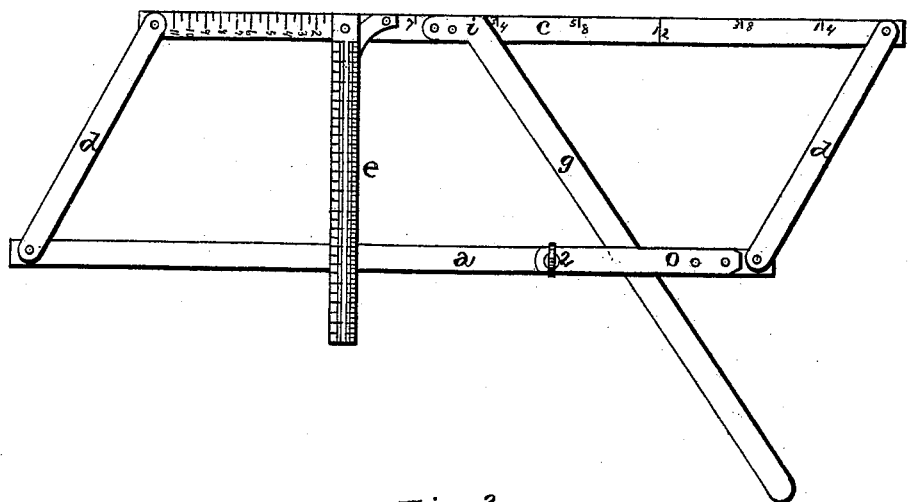
Figure 2:
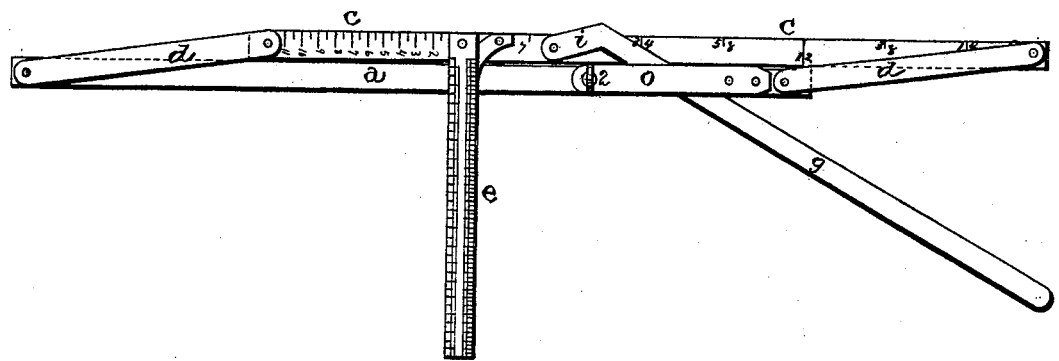

J. G. HENDERSON.
PARALLEL RULER.

No. 171,803. Patented Jan. 4, 1876.

UNITED STATES PATENT OFFICE.

JOHN G. HENDERSON, OF WINCHESTER, ILLINOIS.

IMPROVEMENT IN PARALLEL RULERS.

Specification forming part of Letters Patent No. 171,803, dated January 4, 1876; application filed December 6, 1875.

*To all whom it may concern:*

Be it known that I, JOHN G. HENDERSON, of Winchester, in the county of Scott and State of Illinois, have invented certain new and useful Improvements in Bias-Marker, Square, Parallel Rule, and Yard-Stick; and I do hereby declare the following to be a full, clear, and exact description of the invention, such as will enable others skilled in the art to which it pertains to make and use it, reference being had to the accompanying drawings, which form part of this specification.

My invention relates to an improvement in combined measuring implements, that can be used by dressmakers, tailors, tinners, and draftsmen; and it consists in the arrangement and combination of parts that will be more fully described hereinafter.

The accompanying drawings represent my invention.

The frame of the implement consists of two parallel bars, $a c$, of any length desired, one or both of which are marked off into inches, or any fraction of a yard. These two bars are connected together by means of the two connecting-rods $d$, that are pivoted to their ends, so that the two bars may be brought nearer together or moved farther apart, and yet always be kept parallel. Secured to the bar $c$, and braced in position at right angles thereto, is the bar $e$, which is divided off into equal spaces, and serves to indicate the distance the bar $a$ shall be moved in drawing parallel lines. Pivoted to the bar $c$ is the angle-rod $g$, which has a shoulder, $i$, formed at its pivoted end, that extends along the side of the bar $c$. When the shoulder and bar are exactly in line with each other the rod $g$ projects upward at an angle of about forty-five degrees. Attached to the rod $a$ there is a flat spring, $o$, which forms a guide and clamp for the rod $g$. By tightening the set-screw 2, which passes through its inner end, the frame can be held rigidly in any position. The spaces marked on the left edge of the bar $e$ also serve to indicate, in degrees, the angles formed by $a$ and $d$ at the left end and $c d$ at the right. Thus, by placing any one of these lines at the lower edge of bar $a$, the corresponding angles are formed at both the right and left ends of the implement. These angles are ninety degrees, or any less number. The angles formed by $d a$ at the right, or $d c$ at the left, may be shown by figures indicating degrees on bar $a$, in the space passed over by bar $e$ when sliding; or, the last angles may be instantly found by subtracting acute angle formed at either end of the implement, as shown by figures on bar $e$ at bottom of bar $a$, from one hundred and eighty degrees. Thus, if acute angle between $d$ and $a$ is twenty degrees, then $180°-20=160°$, the angle between $d$ and $c$ at the left, or $a$ and $d$ at the right.

The uses to which this implement may be applied are almost endless, as it is adapted for nearly every workman in wood, metal, or fabrics.

Having thus described my invention, I claim—

1. The angle-rod $g$, having shoulder $i$, attached to one of the bars of a parallel rule, in combination with a clamping device, substantially as set forth.

2. The combination of bars $a c$, rods $d$, angle-rod $g$, and transverse bar $e$, substantially as specified.

In testimony that I claim the foregoing I have hereunto set my hand this 21st day of November, 1875.

JOHN G. HENDERSON.

Witnesses:
 JACOB C. BALSLEY,
 JOHN MOSES.